Nov. 26, 1946.

A. MacKAY 2,411,690

NAVIGATION INSTRUMENT

Filed June 24, 1944

INVENTOR.

Angus MacKay

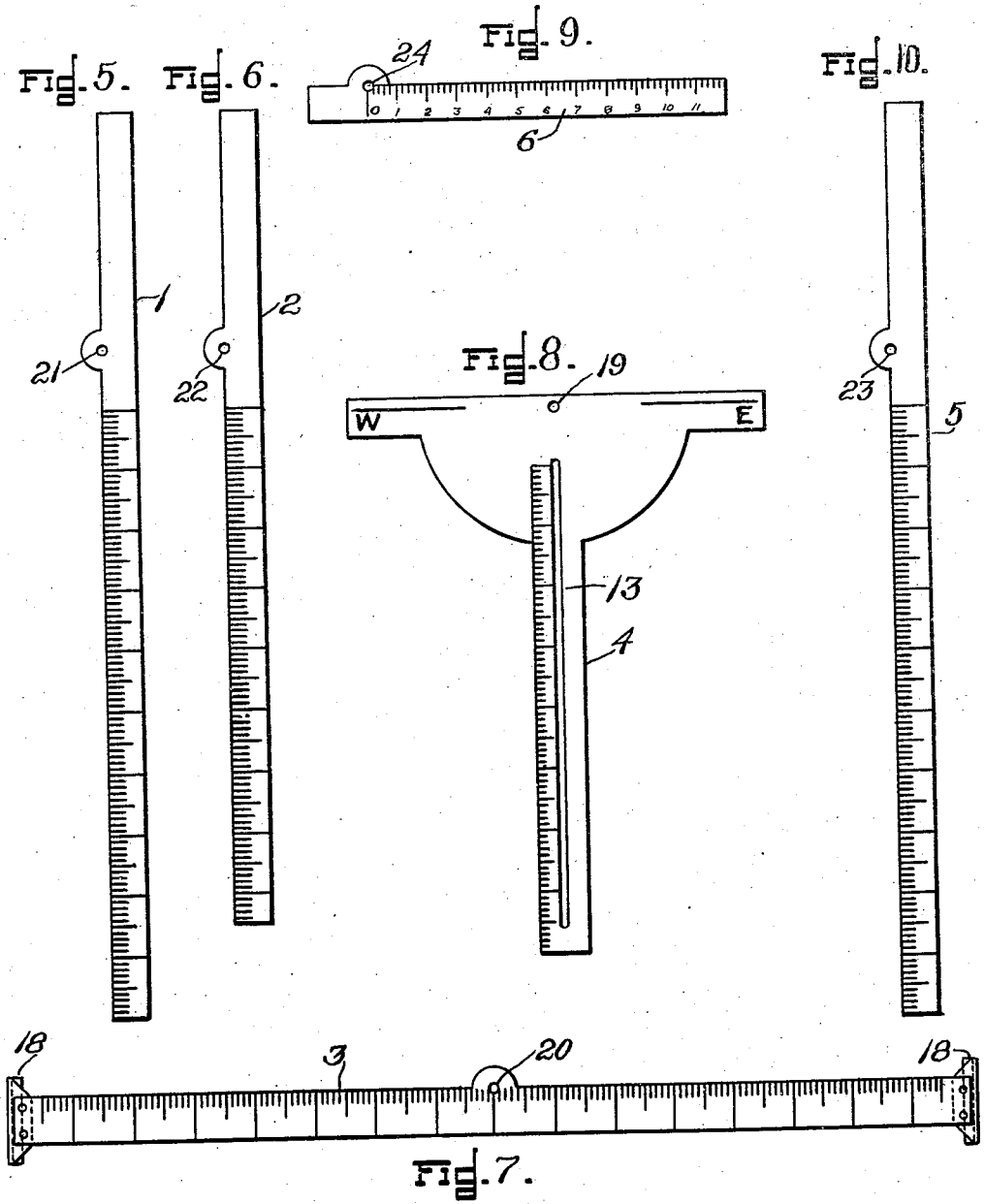

Patented Nov. 26, 1946

2,411,690

UNITED STATES PATENT OFFICE 2,411,690

NAVIGATION INSTRUMENT

Angus MacKay, Dover, Mass.

Application June 24, 1944, Serial No. 541,914

5 Claims. (Cl. 33—98)

My invention relates to an instrument for use in navigating vessels and other craft and its primary object is to provide an instrument of the class referred to by means of which a navigator may expeditiously, satisfactorily and without computation solve dead reckoning problems such as arise, for example, during coastwise, plane, middle-latitude and parallel sailing, etc.

It is also an object of this invention to provide an instrument of the character described which will be light and manually portable and particularly appropriate for use as a part of the equipment of a lifeboat, aeroplane or other voyaging vehicle.

A further object of the invention is to provide an instrument of the character described which will not only be substantially accurate for coastwise sailing, plane sailing, middle-latitude sailing and parallel sailing, but which alone may also be employed to find the distances of latitude and departure as well as difference of longitude up to a predetermined maximum distance, say 200 nautical miles, beyond which, and up to say 600 nautical miles, it will serve accurately for use in finding said difference of longitude when used in conjunction with the auxiliary table for latitude conversion found in Bowditch's "American Practical Navigator."

To these ends I have provided an instrument of the class referred to which, in the preferred embodiment of the invention, may be constructed and operated as hereinafter described, the several novel features of the invention being separately pointed out and defined in the claims at the close of the following description, it being understood, however, that the illustrated embodiment of the invention is to be taken as a preferred example of the latter and that various changes may be resorted to without departing from my invention as defined in the claims.

In the accompanying drawings:

Figures 5, 6, 7, 8, 9 and 10 are elevations of the several scales hereinafter referred to.

Figure 1:
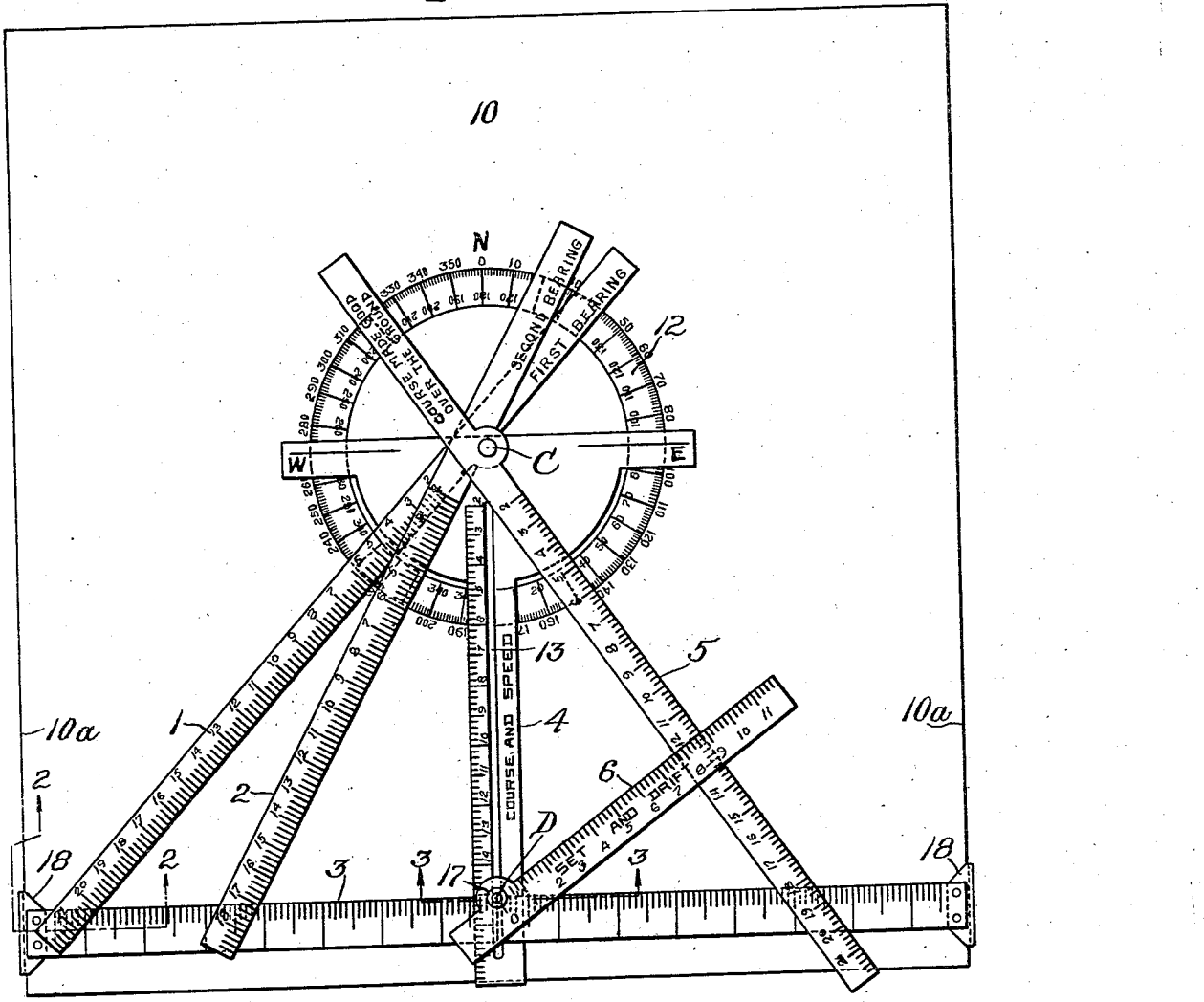
Figure 1 is a plan view of an instrument for use in navigating vessels, said instrument being constructed in accordance with this invention and adapted, as shown, to serve certain purposes.

The illustrated embodiment of my invention comprises a rectangular base panel 10 having oppositely disposed relatively parallel side edges 10a adapted to serve as ways or guides for the opposite ends of one of the scales presently to be described. At or adjacent to its middle the panel 10 has fixed to it an upstanding post C disposed at the center of a circular series of degree graduations 12 printed, inscribed or otherwise provided upon the top face of base panel 10.

Fitting flatwise upon the top side of base panel 10 is a scale 4 (Figs. 1 and 8) preferably made from transparent sheet material such as "Lucite," said scale being made near its upper end with an aperture 19 through which post C extends and also formed with a longitudinal slot 13 whereof one end is adjacent to post C and the opposite end adjacent to the lower end of said scale. This slot 13 is in register throughout its length with a slot 14 (Fig. 4) formed through base panel 10.

A bolt D occupying both slots 13 and 14 is made at its lower end with a rectangular head 16 slidably fitted within slot 14 and engaging the opposite sides of the latter to hold said bolt against rotation, while a thumb nut 17 is mounted upon the upper threaded shank of the bolt.

A scale 3 (Figs. 1 and 7) extending transversely across base panel 10 and scale 4 is formed adjacent to its middle with an aperture 20 that is occupied by bolt D and as will be clear this scale 3 may be clamped to scale 4 and panel 10 by means of thumb nut 17 and bolt D, but when the nut is loosened scale 3 and bolt D are free to be adjusted toward and from post C from end to end of slot 13. Scale 3 is graduated throughout its length in units representing nautical miles. Scale 4 is likewise graduated throughout most of its length in units representing nautical miles as measured from the axis of post C.

Figure 2:
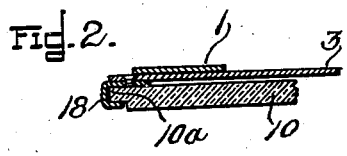
Figure 2 is a section on line 2—2 of Fig. 1.
Figure 3:
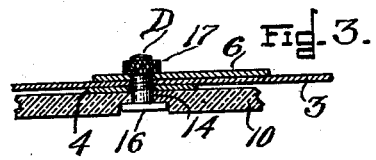
Figure 3 is a section on line 3—3 of Fig. 1.

At its opposite ends scale 3 is provided with bracket shoes 18 which are slidably fitted to the oppositely disposed side edges 10a of base panel 10 as shown in Figs. 1, 2 and 3 so that they serve to maintain scale 3 always at right angles to scale 4, while bolt D and post C serve to maintain scale 4 always parallel with said oppositely disposed side edges where it is perpendicular to scale 3.

Pivotally and removably mounted intermediate their ends upon the post C are three radial scales 1, 2 and 5 whose upper end portions are co-operatively disposed with respect to the upper half of the circular degree scale 12 and whose lower end portions extend across and are co-operatively associated with scale 3, said lower end portions being graduated upon their opposite sides in units representing nautical miles as measured from the axis of post C. These lower end portions of scales 1, 2 and 5 are also co-operatively disposed with respect to the lower half of the circular degree scale 12 so that either half of the latter may be employed in angularly positioning the scales 1, 2 and 5 as presently to be described. Scales 1, 2 and 5 are made, respectively, with apertures 21, 22 and 23 (Figs. 5, 6 and 10) to receive post C.

A scale 6 is also provided which is formed near one end with an aperture 24 so that it can be mounted upon bolt D as shown in Figs. 1 and 3 with capacity for angular adjustment thereon, and so that it is bodily adjustable toward and from post C with scale 3. This scale 6 is also graduated in units representing nautical miles as measured from the axis of bolt D.

All of the above described scales are preferably made from transparent sheet material such as "Lucite," "Vinylite," or the like.

By means of the above described instrument the navigator of a coastwise vessel that is in sight of a fixed landmark whose position is shown upon his chart may plot a chosen or predetermined course past said landmark and may from time to time locate his vessel's position on the chart, its position with respect to said predetermined run or course, and its distance from said landmark, so long as the latter is visible from said vessel, said instrument at the same time providing for determination of the set, drift and course made good over the ground after each logged run.

For example: Assuming the pivot post C to represent a selected landmark visible from the vessel and also shown upon the navigator's chart, such as a lighthouse, and that the top edge of scale 3 is to represent the proposed or chosen course or run that is to be made past the same, a careful compass bearing is taken of the actual landmark and by means of this bearing and compass scale 12 the radial scale 1 is set at a corresponding angle, relatively to course scale 3. Then scale 3 is adjusted into a position where it intersects scale 1 at a point on the latter corresponding with the known distance of the vessel from the landmark represented by pivot post C. Scale 3 will then intersect scale 4 at a distance from pivot post C, as measured on scale 4, at which the vessel will pass abeam of the landmark. At this time a note is made of the reading of the patent log.

After the vessel has proceeded a convenient distance a second bearing is taken on the actual landmark and a second reading of the patent log is made and noted, whereupon radial scale 2 is angularly adjusted on compass scale 12 to agree with this second bearing and the point of intersection of scales 2 and 3 will indicate the position the vessel should occupy if it had remained upon the predetermined course represented by scale 3 while traveling from the position indicated by scale 1 to the position indicated by scale 2. At the same time the distance between scales 1 and 2, as measured by scale 3, will show the distance traveled over the ground provided the vessel had not deviated from the proposed course in which case this distance should be the same as the difference between the first and second log readings.

If, after angularly adjusting or setting scale 2 in accordance with the second compass bearing, the distance between the points of intersection of scales 1 and 2 with scale 3, as measured on the latter, is less than the difference between the first and second log-readings, then the "course" scale 3 is adjusted in a direction away from pivot post C while scales 1 and 2 are retained in their adjusted positions until scale 3 does measure and indicate the proper distance between said two points of intersection. Thus the requirement for adjustment of scale 3 as just described shows that the vessel has been set to starboard by current or wind and the extent of this deflection is shown on scale 4 at the point where it is intersected by scale 3. Also, the distance between the point of intersection of scale 2 with scale 3 and the pivot post C, as measured on scale 2, is the distance of the vessel from the landmark.

If, after angularly adjusting or setting scale 2 in accordance with the second compass bearing, the distance between the points of intersection of scales 1 and 2 with scale 3, as measured by the latter, is more than the difference between the first and second log-readings, then the "course" scale 3 is adjusted in a direction toward pivot C until scale 3 does indicate the proper distance between said two points of intersection, thus showing that the vessel has been set to port by current or wind and the extent of this deflection is measured on scale 4. Also, after thus adjusting the instrument the distance between the point of intersection of scale 2 with scale 3 and the pivot post C, as measured on scale 2, is the distance of the vessel from the landmark.

Due allowance having been made for set and drift of current and scale 1 having been adjusted to occupy the position of scale 2, the vessel proceeds upon its course for a second convenient distance at the end of which the operations above described including adjustment of scales 2 and 3 are repeated. Thus the vessel is piloted step by step on the predetermined course until all of scale 3 has been utilized, whereupon a second landmark ahead is selected and a second course fixed upon.

The scale 4 is also adapted to be used with scales 5 and 6 to compute set, drift and course made good over the ground. This is accomplished as follows:

Assuming that the vessel moves from C toward D a distance of say 15 knots as shown by the patent log, during a given period of time, say one hour, then at the end of that period of time scale 3 is adjusted along scale 4 into a position where bolt D registers with 15 on scale 4. Scale 6 is then set at an angle with respect to scale 4 where it is parallel with the direction of the current at the point corresponding with the position of D as shown by the navigator's chart or given on the navigator's table of currents. The scale 5 is now adjusted angularly on pivot post C to intersect scale 6 at a point corresponding with the extent of the drift of the current in knots per hour as determined from the chart. That portion of scale 5 between pivot post C and scale 6 represents both in length and angular position relatively to C and D the actual course of the vessel made good over the ground and also the speed made good over the ground in knots per hour, the latter being shown by the graduations of scale 5.

The relative positions of the scales 4, 5 and 6 shown in Fig. 1 of the drawings, although exaggerated, may be used to explain this further. As shown in this figure the pivot D registers with scale 4 at a point indicating a travel of 15 miles during the selected period of time of one hour; the angle at which scale 6 is set with respect to scale 4 indicates the angular relationship between the direction of the current with respect to the proposed course C—D, while scale 5 is shown as intersecting scale 6 at 8.8 knots, the latter being the speed of the current per hour as found on the chart. This setting of the scales of Fig. 1 shows by the intersection of scales 5 and 6 the length of the course made good over the ground to be 12 knots as measured on scale 5, and its direction, the latter being shown by the position of scale 5 relatively to C and D.

Therefore, in order to compensate for the current influences which would otherwise operate to divert the vessel from its proper straight line course from C to D the pilot will be directed by the adjusted instrument to steer a course at an angle and to the left of scale 4 (Fig. 1) equal to the angle 4—5 with the result that the vessel will travel an approximately straight line course from C to D.

If the chart indicates the current as parallel with scale 3, then it is not necessary to utilize scale 6, but scale 3 can be used to measure the set and drift of the current by adjustment of scale 5 relatively thereto, measuring off the speed of the current per unit of time in nautical miles on scale 3 starting from pivot D, and placing scale 5 to intersect the latter at that point.

In other words, as a preliminary to the proper setting of scale 3 toward or from pivot C, the scale 5 is used either with the scale 6 or, if the current is in the same direction or parallel with the scale 3, then with scale 3 itself without use of scale 6.

The use of scales 4, 5 and 6 is thus independent of the use of scales 1, 2, 3 and 4, except that from the factors as determined by 4, 5 and 6 the proper setting of bolt D with respect to point C is accomplished. Scales 4, 5 and 6 are employed to determine the effective current influence to which the ship is likely to be subjected in traveling over a proposed course and from this information can be determined the proper steering course on which to proceed in traveling from point C.

As stated above, each scale 1, 2 and 5 is graduated the same upon its opposite sides and the only difference between the two series of graduations, viz., those upon one side or face of each scale and those upon the opposite side thereof, is the value which the user of the instrument may elect to allot to each unit. However, in Fig. 1 of the drawings one side of each of the three scales referred to is uppermost and its graduations may, as shown, be numbered to fix the value of each unit thereof as one mile, while in Fig. 4 of the drawings the opposite side of each of the three scales referred to is uppermost and the value of each unit thereof may be regarded as 5 miles. The lower value of one mile per unit, when fixed mentally or by numbers, renders the instrument particularly adapted for coastwise sailing where the runs are relatively short, while the higher value of 5 miles per unit, when fixed mentally or by numbering, renders the instrument particularly adapted for middle latitude sailing where the courses are relatively much longer.

Figure 4:
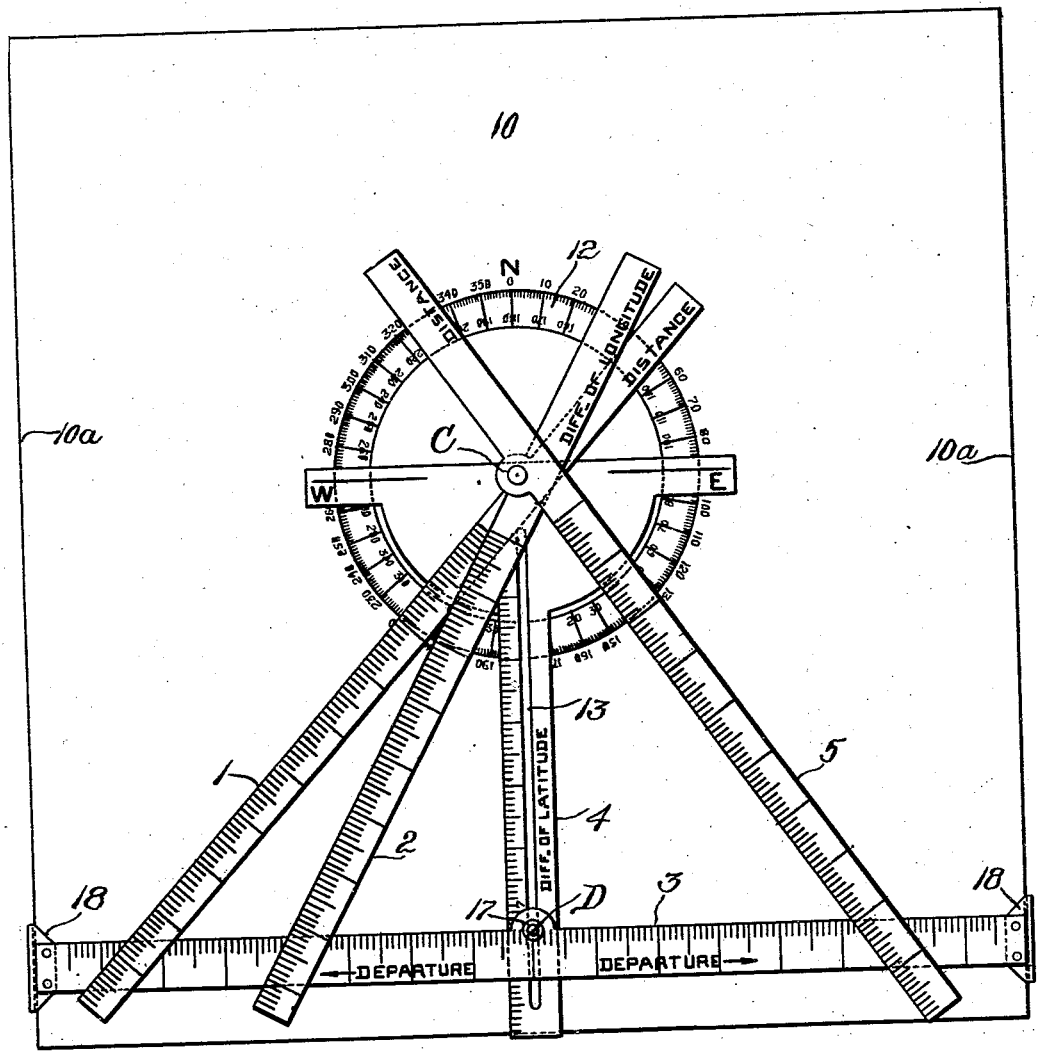
Figure 4 is a plan view of the instrument shown in Fig. 1 but showing the same adapted to serve other purposes.

If the value of each unit of scales 1, 2 and 5 is fixed mentally then the numbering may be omitted and the instrument used for both coastwise and middle latitude sailing with said scales permanently arranged on pivot post C as shown in Fig. 1, but when numbered as shown in the drawings said scales are reversed upon post C as shown in Fig. 4 while middle latitude sailing.

When, during middle latitude sailing, the compass course and distance are known, the above described instrument may be employed to determine the difference of latitude and the departure as follows: The known information includes the distance which, for example, may be 300 miles and the compass course may be assumed to be 146 degrees east. Scale 5 is now set by means of scale degrees east. Scale 3 is 12 for the compass course after which scale 3 is adjusted to coincide with the 300 mile indication on scale 5. With this setting of the scales 3 and 5 the distance between bolt D and scale 5, as measured on scale 3, is equal to the departure, and at the same time the distance between pivot post C and bolt D, as measured on scale 4, gives the difference in latitude.

When, during middle latitude sailing, the difference of latitude and the departure are known, the instrument may be used to determine the course and distance as follows: The known information includes the difference of latitude which, for example, may be 136 miles, and the departure may be assumed to be 203 miles, westerly. Scale 3 is now registered with 136 miles on scale 4 and scale 1 is registered with a point on scale 3 that indicates 203 miles to the left of pivot post D. Scale 1 now registers with compass scale 12 to show a compass course of 56 degrees westerly, and the distance from pivot post C to the point of intersection between scales 3 and 1 gives the course distance as 244.3 miles.

From the two examples given in the immediately preceding two paragraphs it should be clear that the instrument above described may also be employed in expeditiously determining the following: (1) The departure and distance when the compass course and difference of latitude are known. (2) The distance and difference of latitude when the course and departure are known. (3) The course and departure when the distance and difference of latitude are known, and (4) the course and difference of latitude when the distance and departure are known.

To determine difference of longitude the procedure is as follows: The departure is first determined by means of the instrument as above described, or otherwise, and this departure is measured off on scale 4 from pivot C and scale 3 is set to coincide therewith. Then scale 2 is angularly adjusted by means of compass scale 12 so that it is disposed at an angle with relation to scale 4 corresponding with the middle latitude course. The difference of longitude is then read on scale 2 from pivot C to the point of intersection of scales 2 and 3.

What I claim is:

1. An instrument of the character described comprising a base panel bearing a fixed circular series of compass graduations; two straight elongate scale members extending diametrically across said circular series of compass graduations and pivotally mounted intermediate their ends upon said panel for angular adjustment on an axis at the center of said circular series of compass graduations and each bearing a longitudinal series of mileage graduations disposed so as to be read as starting at said axis; a third transversely disposed straight scale member bearing a longitudinal series of mileage graduations; a fixed scale of mileage graduations on said panel extending radially away from said axis perpendicularly toward said transversely disposed scale member and disposed so as to be read as starting at said axis, the mileage graduations of said third transversely disposed scale member being disposed so as to be read in either direction from the point of intersection of said third member with said fixed radial scale, and means slidably connecting said third transversely disposed scale member to said base panel so that it is manually adjustable bodily on said panel toward and from said axis while held against endwise and pivotal displacement and with its intermediate portion intersecting said two first-mentioned scale members and also said fixed radial scale; a fourth straight elongate scale member extending diametrically across said circular series of compass graduations and pivotally mounted intermediate its ends upon said panel for angular adjustment on said axis, said fourth member bearing a longitudinal series of mileage graduations disposed so as to be read as starting at said axis, and a fifth current-direction indicating scale member co-operatively associated with said fourth scale member, said fifth member being pivotally connected with said third transversely disposed scale member at the point of intersection of the latter with said radial scale and bearing a longitudinal series of mileage graduations disposed so as to be read as starting at said point of intersection.

2. An instrument of the character described constructed in accordance with claim 1 and wherein there is also provided manually operable means for releasably clamping said fifth scale member to said third transversely disposed scale member.

3. An instrument of the character described constructed in accordance with claim 1 and wherein there is also provided manually operable means for releasably clamping said third and fifth scale members together and to said panel with provision for bodily adjustment of said members lengthwise of said radial scale when released.

4. An instrument of the character described comprising a base panel bearing a fixed circular series of compass graduations; an elongate scale member extending diametrically across said circular series of compass graduations and pivotally mounted upon said panel for angular adjustment on an axis at the center of said circular series of compass graduations, said member bearing mileage graduations disposed so as to be read as starting at said axis; a second transversely disposed straight scale member bearing mileage graduations and co-operable with said first scale member to determine the course made good over the ground; a fixed scale of mileage graduations on said panel extending radially away from said axis perpendicularly toward and across said second transversely disposed scale member; means connecting said second transversely disposed scale member with said panel so that it is slidably adjustable bodily on said panel toward and from said axis while maintained in position at right angles to said fixed radial scale; and a third current-direction indicating scale member co-operatively associated with said first scale member, said third member being pivotally connected with said second transversely disposed scale member at the point of intersection of the latter with said radial scale and bearing a longitudinal series of mileage graduations disposed so as to be read as starting at said point of intersection.

5. An instrument of the character described comprising a base panel bearing a fixed circular series of compass graduations; two straight elongate scale members extending diametrically across said circular series of compass graduations pivotally mounted intermediate their ends upon said panel for angular adjustment on an axis at the center of said circular series of compass graduations and each bearing a longitudinal series of mileage graduations disposed so as to be read as starting at said axis; a third transversely disposed straight scale member co-operatively disposed with respect to said two members and bearing a longitudinal series of mileage graduations; a fixed scale of mileage graduations on said panel extending radially away from said axis perpendicularly across said third transversely disposed scale member and disposed so as to be read as starting at said axis; means connecting said third transversely disposed scale member with said panel so that it is slidably adjustable bodily on said panel toward and from said axis while maintained in a position at right angles to said fixed radial scale, and a fourth straight elongate distance-indicating scale member co-operatively associated with said third transversely disposed scale member and said compass graduations, said fourth member being pivotally mounted upon said panel for angular adjustment on said axis and bearing a longitudinal series of mileage graduations disposed so as to be read as starting at said axis, and said third transversely disposed scale member bearing mileage graduations to be read in either direction starting at the point of intersection of said fixed radial scale with said third transversely disposed scale member.

ANGUS MacKAY.